Sept. 13, 1960          J. E. COTTLE          2,952,671
RECOVERY OF OLEFIN POLYMERS FROM SOLUTION
Filed Sept. 30, 1957
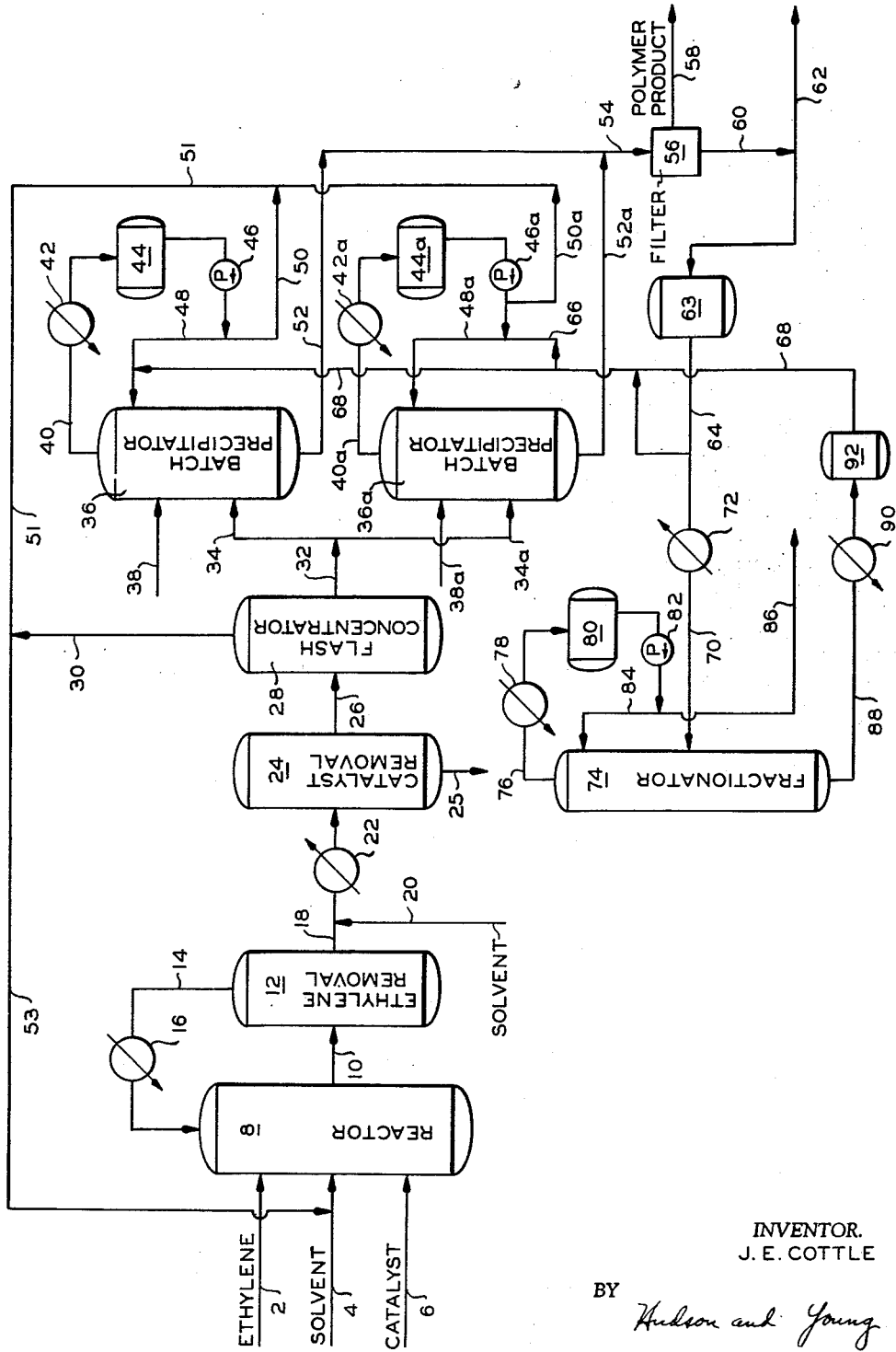
INVENTOR.
J. E. COTTLE
BY
Hudson and Young
ATTORNEYS.

United States Patent Office 2,952,671
Patented Sept. 13, 1960

2,952,671

RECOVERY OF OLEFIN POLYMERS FROM SOLUTION

John E. Cottle, Bartlesville, Okla., assignor to Phillips Petroleum Company, a corporation of Delaware Filed Sept. 30, 1957, Ser. No. 687,133

5 Claims. (Cl. 260—94.9)

This invention relates to the recovery of solid olefin polymers from solution. In one aspect it relates to an improved process for precipitating solid olefin polymers from the solution by cooling.

As used herein the term solid polymers includes in addition to the normally solid materials those polymers of low molecular weight which are tacky in nature and also semi-solid waxy type polymers.

Solid olefin polymers treated in the method of this invention are prepared by a number of methods which usually result in a product which is dissolved in a diluent or solvent material. Inasmuch as the polymers are used primarily in a solid condition, it becomes necessary to precipitate or otherwise remove the solid polymer from solution. Various methods have been proposed for this purpose, however, difficulties have arisen in that the characteristics of the polymer products obtained by conventional methods appear to be greatly affected by the particular separation process employed. Thus, in one process the polymer is precipitated from solution in a "superfine" condition of subdivision which makes it difficult to effect recovery of the precipitated solid from the solvent. In another method, the precipitated polymer contains a quantity of small particles which form imperfections when the polymer is formed into a film product. These imperfections which are usually of a size to be just perceptible to the eye are sometimes called "fish eyes" in the art. In another method of treatment, the polymer removed from solution is stringy or fibrous in nature and, therefore, does not provide the type of product which is readily recovered from the solvent by filtration, centrifugation or other conventional means. It is desirable to obtain a homogeneous product that is solid polymer having a substantially uniform product size or range of size so that separation of the precipitated material from the solvent is readily effected and so that quality control of finished products of the polymer can be established.

In a copending application of R. A. Findlay, Serial No. 591,864, filed June 18, 1956, now Patent No. 2,825,721, a method of operation which overcomes these difficulties has been proposed. In carrying out this improved process, precipitation of polymer from solution is effected in a batch precipitation operation in which the solution is introduced to a batch cooling zone from which heat is removed by autorefrigeration, namely by reducing the pressure on the solution. The rate of pressure reduction is controlled to provide a substantially uniform rate of temperature decrease in the solution whereby polymer is precipitated. Following precipitation, the polymer and solvent are removed from the cooling zone for further treatment for the recovery of the precipitated polymer and the cooling zone is reheated in preparation to receive a fresh charge of solution. It has been found that the foregoing method of operation provides a homogeneous product having a substantially uniform range of product size, which is easily filtered.

The method of this invention is related to the above process and constitutes an improvement over said process.

It is an object of this invention to provide an improved process for the recovery of solid olefin polymers from solution.

Another object of the invention is to provide an improved process for the precipitation of olefin polymers from solution by cooling.

Still another object of the invention is to provide an improved process for increasing the recovery of solid olefin polymers from solution by cooling.

These and other objects of the invention will become more readily apparent from the following detailed description and discussion.

The foregoing objects are achived broadly by cooling a solution containing solid olefin polymers at a controlled rate to provide a substantially uniform rate of temperature decrease whereby a portion of the solid polymer is precipitated, separating the precipitated polymer from the polymer solution and recycling the polymer solution to the precipitation step whereby the quantity of polymer precipitated from solution is increased. Since the precipitation process is a cyclic process it is necessary for continuous operation to provide a plurality of precipitation zones whereby various stages of the precipitation process are carried on continuously in the various zones with recycle of polymer solution being provided to the specific zone or zones which are operating in the cooling portion of the precipitation cycle.

In one aspect of the invention all of the polymer solution separated from the precipitated polymer is recycled whereby substantially complete recovery of polymer from solution is effected.

In another aspect of the invention only a portion of the polymer solution separated from the precipitated polymer is recycled whereby control of the molecular weight of the precipitated polymer is obtained.

In still another aspect of the invention when only a portion of the separated polymer solution is recycled the remaining portion of the solution is separated by fractionation into fractions containing heavier and lighter polymers and the fraction containing heavier polymers is also recycled to the precipitation step.

The polymers which are treated within the scope of this invention include a wide variety of olefin polymers, such as, for example polymers or copolymers of monoolefins like ethylene, propylene, butylene, etc., also copolymers of monoolefins and diolefins such as butadiene, isoprene, etc. The invention is particularly applicable to polymers of 1-olefins having a maximum of 8 carbon atoms per molecule and no branching nearer the double bond than the 4-portion and more particularly to polymers of ethylene which have a specific gravity of at least 0.94 at 20° C. and preferably 0.96 or higher and a crystallinity of at least 70 percent and preferably at least 80 percent at ordinary atmospheric temperatures.

A preferred polymerization method is described in detail in a copending application of Hogan and Banks, Serial No. 573,877, filed March 26, 1956. This particular method utilizes a chromium oxide catalyst, preferably containing hexavalent chromium, with silica, alumina, silica-alumina, zirconia, thoria, etc. In one embodiment of this application, olefins are polymerized in the presence of a hydrocarbon diluent, for example an acyclic, alicyclic or, less preferably, aromatic compound which is inert and liquid under the reaction conditions. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymer prepared by both methods are also characterized by their high densities and high percentage of crystallinity at normal atmospheric temperatures.

Other less advantageous procedures which employ different catalyst are also used for preparing olefin polymers. For example, polymers are prepared in the presence of organometallic compounds such as triethylaluminum plus titanium tetrachloride, mixtures of ethyl aluminum halides with titanium tetrachloride, and the like. Another group of catalyst which is used comprises a halide of a Group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is usually maintained at a sufficient level to assure a liquid phase reaction, that is at least about 100 to 300 p.s.i.g., depending upon the type of feed material and the polymerization temperature. Higher pressures up to 500 to 700 p.s.i.g or higher can be used, if desired. If it is desired to carry out the process in the vapor state much lower pressures, down to atmospheric, can be employed. When utilizing a fixed bed the space velocity varies from as low as about 0.1 to about 20 volumes of feed per volume of catalyst, with the preferred range being between about 1 and about 6 volumes per volume per hour. When operating with a mobile catalyst it is desirable to maintain the catalyst concentration in the reaction zone between about 0.01 and and about 10 percent by weight. Residence time can be from 10 minutes or less to 10 hours or more.

The use of a diluent in the polymerization reaction in general serves two purposes. Since the reactions are usually exothermic in nature, the presence of a quantity of diluent provides a method for obtaining close control of the reaction temperature. In addition, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes in general, saturated hydrocarbons. Among the more useful solvents are acyclic paraffins having between about 3 and about 12 carbon atoms per molecule, such as, for example, propane, isobutane, n-pentane, isopentane, isooctane, etc., and preferably those acyclic paraffins having 5 to 12 carbon atoms per molecule. Also useful in the polymerization reaction are alicyclic hydrocarbons, such as cyclohexane, methylcyclohexane, etc. Aromatic diluents are not normally used because they (or impurities therein) tend to shorten the catalyst life; however, if catalyst life is not an important factor in the process, solvents of an aromatic nature can also be employed. All of the foregoing and in addition, other hydrocarbon diluents which are relatively inert, nondeleterious, and in the liquid state at the reaction conditions can also be employed in carrying out the reaction of olefins to form solid polymers.

In carrying out the invention in one embodiment thereof, effluent from a polymerization reaction, comprising a mixture of olefin polymer and hydrocarbon solvent which has been treated for the removal of catalyst and unreacted olefin, is introduced to a batch cooling zone. Generally, several zones are provided in parallel so that reaction effluent is continuously entering at least one zone. However, if desired, the operation can be carried out with only one cooling zone by providing surge capacity for the reaction zone effluent. After filling of the cooling zone is completed, the flow of material thereto is stopped and cooling of the solution in the zone is commenced whereby there is provided a uniform controlled decrease in temperature. The solubility of the olefin polymers in the solvent material is a function of temperature and as the material is cooled, polymer begins to precipitate from solution. The cooling process is continued until the major quantity of polymer is precipitated therefrom, after which the cooling zone is emptied and the contents are passed through a separation step wherein precipitated polymer is separated from the solvent. It is not possible to remove all of the polymer from the solution because of limitations as to the minimum temperature which can be attained in the cooling zone. Thus the diluent after removal of precipitated polymer still contains dissolved polymers. This material is treated in the method of this invention, as hereinafter described, for the removal of residual polymer.

To provide a homogeneous product of the desired particle size, it is necessary that the rate of cooling be carefully controlled to provide a uniform drop in temperature in the polymer solution. Cooling at too slow a rate produces a product having a very fine particle size which is difficult to filter. Shock chilling on the other hand frequently produces a jelly-like material which also presents recovery problems. In general it has been found desirable to cool the solution between about 1° F. and about 20° F. per minute and preferably between about 5° F. and about 15° F. per minute. For the best results an even narrower cooling range is employed, namely, from between about 6° F. to about 9° F. per minute. The bulk density of dried product obtained by cooling in this manner varies between about 8 and about 20 pounds per cubic foot, more usually between about 10 and about 12 pounds per cubic foot. The size of the precipitated particles varies usually from between about 50 to about 500 microns.

The operating temperature range in the batch cooler is determined by the temperature at which the polymer precipitated from solution. This in turn is a function of the molecular weight of the polymer and the specific solvent or diluent used. The polymer which is present in the solution comprises materials having a wide range of molecular weight. As a result all of the polymer does not precipitate at single temperature but rather precipitates over a range of temperatures. For example, with an ethylene polymer having a molecular weight of between about 15,000 and about 25,000 it has been found that a substantial portion of the polymer will precipitate from isooctane at about 180° F. and from cyclohexane at about 165° F. When a heavier polymer for example, an ethylene polymer having a molecular weight between about 35,000 and about 45,000 is treated substantial precipitation of polymer takes place from cyclohexane at about 170° F. When removing the aforedescribed polymers from solution, precipitation of the highest molecular weight polymers present in the solution commerces about 200 to 225° F. and as the temperature of the solution is reduced lower molecular weight polymers are precipitated from the solution. The practical minimum temperature which can be obtained is set by the vacuum equipment which is available. Usually it is not desirable to lower the pressure in the precipitation zone below about 4 to 6 pounds p.s.i.a. When processing a solution of polymer in cyclohexane this pressure range establishes a final temperature in the precipitation zone of between about 105 and about 130° F. When this temperature is reached during the batch cooling cycle the proportion of the polymer which precipitates from solution is usually between about 90 and about 98 percent. Thus, even when the minimum practicable cooling temperature is employed, from about 2 to about 10 weight percent of the polymer remains in solution.

The quantity of polymer which precipitates from solution is not only a function of temperature and molecular weight but also is related to the amount of material of a given molecular weight which is present in the solution, and increasing the quantity of polymer in a given molecular weight range has a "salting out" effect whereby additional polymer in this molecular weight range is precipitated. In the method of this invention substantially all of the polymer which normally remains in solution after the batch cooling and precipitation process is completed can be effectively removed therefrom by recycling solvent containing dissolved polymer to the precipitation zone. The quantity of polymer which is recycled depends on a number of factors, including the amount of polymer which is present in the recycle solution, the particular solvent employed in the process, the amount of polymer which is normally precipitated in the batch precipitation operation and the molecular weight which is desired in the final polymer product. Usually it is desirable to recycle sufficient solution to increase the concentration of the low molecular weight polymer which is not normally precipitated to between about 1 and about 10 times its normal concentration in the polymer solution entering the batch precipitation zone.

Another factor in the amount of polymer precipitated by controlled cooling is the concentration of polymer in the feed solution. In general, it is desirable that the concentration of polymer in the diluent entering the precipitation zone be maintained at a low level, usually between about 1 and about 15 percent by weight and preferably between about 3 and about 5 percent by weight.

A number of methods are available for providing the cooling required for carrying out the invention. For example, indirect heat exchange methods can be employed such as, for example, by the use of cooling coils disposed within the cooling zone containing a circulating refrigerant, by the use of a double wall cooling zone with a cooling agent between the walls, etc. Direct cooling methods can also be used. These include injection of cold diluent into the cooling zone, cooling by auto-refrigeration, etc. Although any of these methods may be used, the preferred method of operation employs auto-refrigeration, whereby the cooling required is provided by vaporation of diluent from the solution in the batch cooling zone. When operating in this manner, it is not necessary to provide agitation since boiling of the solvent from the cooling zone serves to create turbulence in the solution. Also, cooling by auto-refrigeration substantially eliminates variations in temperature in different parts of the cooling zone, which may be present when other methods of cooling are used. It is desirable to maintain a relatively high ratio of solvent to polymer in the cooling zone. This is easily accomplished when cooling by auto-refrigeration by introducing make-up solvent into the cooling zone to replace that vaporized during cooling. Control of the solvent concentration is not possible, of course, when cooling is provided by introducing cold solvent to the cooling zone. It is apparent from the foregoing that the various cooling methods do not provide equivalent results and that auto-refrigeration has a number of advantages which recommend it for use in the process of this invention.

As previously mentioned, prior art methods of recovering solid polymers from solution by precipitation have suffered from a number of disadvantages and in many instances the physical properties of the recovered polymer have been such as to make separation of precipitated polymer from the solvent extremely difficult. In the method of this invention, the polymer is precipitated as a substantially homogeneous product in that it contains particles having substantially uniform characteristics and within a range of size so as to make them easily separated from the liquid by conventional separation means such as, for example, filtration, centrifugation, etc. In addition, the homogeneity of the product obtained by this invention has made close quality control of finished polymer products possible. Also the products of this process are superior in gloss, odor and color to olefin polymers prepared by other processes.

In order to more clearly describe the invention and provide a better understanding thereof, reference is had to the accompanying drawing which is a diagrammatic illustration of a system for recovering polymer from solution, including a reaction zone and catalyst separation system, two batch precipitators in parallel for the removal of polymer from solution by precipitation, a filter for separating polymer product from polymer solution, a fractionator for separating polymer solution into fractions and associated auxiliary equipment. Referring to the drawing, ethylene, cyclohexane diluent and chromium oxide catalyst are introduced to reactor 8 through conduits 2, 4, and 6, respectively. For ease of handling the catalyst is slurried in cyclohexane before it is introduced to the reactor. During polymerization the material in the reactor is maintained in a highly agitated state by means of a mechanical mixer or other conventional mixing means (not shown). The reaction is carried out at a temperature of about 285° F. and a pressure of about 500 p.s.i.a. and for a sufficient period of time to convert a portion of the ethylene feed to solid ethylene polymer (at normal atmospheric temperatures). The reaction effluent leaves the reactors through conduit 10 and enters a separation zone 12 wherein a stream comprising principally unconverted ethylene and some solvent its separated and returned to the reactor through conduit 14 and cooler 16. Following this step the effluent is combined with additional solvent introduced through conduit 20, the mixture passing through exchanger 22 wherein the temperature is increased. The effluent then passes to catalyst recovery zone 24 through conduit 18. This zone may be a filter, a centrifuge, or the like designed to operate at super-atmospheric pressure. Separated catalyst which is removed through conduit 25 can be recycled to the reactor or discarded. As necessary all or part of the recycled catalyst can be subjected to a regeneration treatment with oxygen for the removal of heavy polymers deposited thereon during polymerization. The remaining reaction effluent now comprising a solution of ethylene polymer and cyclohexane is introduced through conduit 26 to flash concentrator 28. In this vessel cyclohexane is vaporized and removed through conduit 30 and recycled to the cyclohexane feed to the reactor. Accordingly, the concentration of diluent in the reaction effluent is reduced to a suitable level for the batch precipitation operation which follows. This operation is accomplished by introducing the ethylene polymers in solution to batch percipitators 36 and 36a through conduits 34 and 34a, respectively. As signified by the term "batch" this portion of the process is non-continuous in nature and it is desirable therefore to provide more than one precipitation vessel. In this specific example two vessels are are provided; however, this is merely illustrative and any number of vessels can be employed. For purposes of illustration the following discussion will be directed to carrying out the precipitation in vessel 36. However the same operations also apply to vessel 36a although not necessarily carried out at the same time.

Prior to entry of the polymer solution into batch precipitator 36 this vessel is heated by warm cyclohexane introduced through conduit 34 to a suitable temperature level to prevent lowering of the temperature of the entering polymer solution during filling of the precipitator. After filling is commenced the flow into the precipitator is continued until the solution therein reaches a predetermined level at which time the flow is switched to precipitator 36a. Conduit 34 is then blocked off and the precipitation portion of the cycle is commenced by gradually reducing the pressure on precipitator 36. At this point the solution in the batch precipitator contains about 6 percent polymer by weight. As the pressure in the precipitator is lowered a portion of the cyclohexane vaporizes and passes upwardly through conduit 40, condenser 42 and into accumulator 44. That portion of the material condensed in condenser 42 is removed from the accumulator, with a portion being returned to the precipitator through conduit 48 and the remainder being passed through conduits 50, 51 and 53 for combination with the solvent entering the reactor. If desired a portion of the latter stream can be separated and passed to storage or other use. As cyclohexane vaporizes and the temperature in the batch precipitator is reduced ethylene polymers begin to precipitate from solution. Precipitation of the polymers takes place according to their molecular weights with the high molecular weight materials being the first to leave solution. The precipitation operation is continued until the pressure in the cooler reaches substantially below atmospheric and the major portion of the dissolved polymer precipitates. In order to maintain the desired concentration of solvent in the precipitator the material vaporized therefrom is replaced as previously noted by recycling solvent from accumulator 44. The entire cooling process is carefully controlled and the pressure in the batch precipitator is reduced at a rate so as to provide a uniform rate of temperature reduction, namely about 7½° F. per minute. If desired, agitation can be provided in the batch precipitator; however, usually the turbulence created by evaporation of the solvent is adequate to prevent the precipitated polymer from settling to the bottom of the vessel. In addition, the turbulence which exists during the cooling portion of the cycle also assists in preventing variations in temperature in different areas of the cooling zone.

Upon completion of the cooling cycle batch precipitator 36 is opened to conduit 52 and the material contained therein is withdrawn as a slurry and introduced to filter 56 through conduit 54. Filtered polymer product containing some solvent is withdrawn from the filter through conduit 58 and yielded from the unit. As desired this material can be subjected to further processing (not shown) to remove residual polymer and thus provide a dry polymer product. The filtrate from filter 56, containing that portion of the polymer which is not precipitated in the foregoing operation, is removed through conduit 60 and introduced to tank 63. As desired a portion of this material can be yielded through conduit 62. Filtrate which accumulates in tank 63 is removed therefrom, passed through conduit 64 and introduced to batch precipitators 36 and 36a through conduits 66 and 68, respectively. This material is introduced to the batch precipitators during the periods when these vessels are being cooled to precipitate polymer from solution. The filtrate can be introduced to the precipitators at any stage of the cooling process, however, since the polymers contained in the filtrate are low in molecular weight and thus the last to precipitate from solution this material is preferably introduced to the precipitators during the latter portion of the cooling cycle.

By virtue of the nature of the process, the filtrate material always contains some low molecular weight polymer. As previously stated, a portion of the filtrate can be yielded through conduit 62. The operation is usually carried out in this manner when it is desired to retain a portion of at least the lighter polymer material in solution. If it is desired to precipitate substantially all of the polymer from solution this can be accomplished in either of two ways, namely by recycling all of the filtrate to the batch precipitators or by recycling only a portion of the filtrate and processing the remainder of the filtrate to remove soluble polymer therefrom. When it is desired to operate according to the latter method a portion of the filtrate from tank 63 is passed through conduit 70 and heater 72 into a fractionator 74. In this vessel the filtrate is separated into two fractions, an overhead fraction substantially free from polymer and a bottoms fraction concentrated in polymer. The lighter fraction passes overhead from fractionator 74 to conduit 76, condenser 78 and into accumulator 80. Condensed material is withdrawn from accumulator through pump 82 and a portion thereof is returned to the fractionator through conduit 84 as reflux and the remainder is yielded through conduit 86. The fractionator bottoms are removed through conduit 88, cooled in cooler 90, and passed to accumulator 92 from which they are removed as desired and combined with the filtrate entering the various batch precipitators. If desired a portion of the fractionator bottoms can be yielded from the system (not shown).

The following data is presented to illustrate a typical application of a preferred embodiment of the invention on a commercial scale.

EXAMPLE

An ethylene polymer is prepared in the presence of a catalyst comprising 2.5 percent by weight of chromium as chromium oxide, containing 2.2 weight percent of hexavalent chromium with silica-alumina (90/10), prepared by impregnating particulate silica-alumina with a solution of chromium oxide, followed by drying and activation in air at gradually increasing temperatures up to 950° F. The polymer is prepared and processed in accordance with the following conditions:

*Flows*

| | Lb./hr. |
|---|---|
| Feed to reactor (8) | 43,000 |
| Composition: Wt. percent | |
| Ethylene _____ 13.40 | |
| Cyclohexane _____ 86.40 | |
| Catalyst _____ 0.20 | |
| Reactor effluent (10) | 43,000 |
| Composition: Wt. percent | |
| Ethylene _____ 5.40 | |
| Cyclohexane _____ 86.40 | |
| Polymer _____ 8.00 | |
| Catalyst _____ 0.20 | |
| Feed to flash concentrator (28) | 115,000 |
| Composition: Wt. percent | |
| Ethylene _____ 0.15 | |
| Cyclohexane _____ 97.00 | |
| Polymer _____ 2.85 | |
| Feed to batch precipitators (34 and 34a) | 80,000 |
| Composition: Wt. percent | |
| Ethylene _____ 0.02 | |
| Cyclohexane _____ 95.92 | |
| Polymer _____ 4.06 | |
| Slurry from batch precipitators (52 and 52a) | 72,500 |
| Composition: Wt. percent | |
| Ethylene _____ 0.01 | |
| Cyclohexane _____ 95.49 | |
| Polymer _____ 4.50 | |
| Filter cake (58) | 12,875 |
| Composition: Wt. percent | |
| Cyclohexane _____ 75.0 | |
| Polymer _____ 25.0 | |
| Batch precipitated polymer product | 3,219 |
| Molecular weight _____ 43,000 | |
| Filtrate recycle (64) | 19,750 |

| Composition: | Wt. percent | Lb./hr. |
|---|---|---|
| Cyclohexane | 99.93 | |
| Polymer | .07 | |
| Net filtrate (62) | | 39,875 |
| Composition: | Wt. percent | |
| Cyclohexane | 99.93 | |
| Polymer | .07 | |
| Polymer molecular weight | 1200 | |

*Temperatures*

| | °F. |
|---|---|
| Reactor (8) | 285 |
| Catalyst removal (24) | 300 |
| Flash concentrator (28) | 240 |
| Filter (56) | 120 |

*Pressures*

| | P.s.i.a. |
|---|---|
| Reactor (8) | 500 |
| Catalyst removal (24) | 150 |
| Flash concentrator (28) | 38 |
| Filter (56) | 5.2 |

*Operating cycle of batch cooler*

7.5 minutes for filling
14.0 minutes for cooling
{Temperature 225° F.—pressure 33 p.s.i.a.
(7.5° F. per minute)
Final temperature 120° F.
Final pressure 5.2 p.s.i.a.

7.5 minutes for draining.
7.5 minutes for reheat.

*Batch cooler size*

6,000 gallons—Filled approximately ½ full before beginning each cooling cycle.

Having thus described the invention by providing a specific example thereof it is to be understood that no undue limitations or restrictions are to be drawn by reason thereof and that many variations and modifications are within the scope of the invention.

I claim:

1. A process for recovering an olefin polymer in solid form from a solution thereof in a plurality of precipitation zones in cyclic operation, comprising, introducing said solution into one of said precipitation zones; reducing the pressure in said precipitation zone to produce auto-refrigeration, the rate of pressure reduction being controlled to provide a substantially uniform rate of temperature decrease; stopping the pressure reduction after a portion of the polymer has precipitated; removing the resulting mixture of precipitated polymer and solvent from the precipitation zone; separating precipitated polymer from the solution; and recycling the solution separated from the solid polymer containing polymer dissolved therein directly to the precipitation zone whereby substantially all the polymer is ultimately precipitated from the solution.

2. The process of claim 1 in which a portion of the separated polymer solution is recycled and the remainder of said solution is processed to recover a fraction concentrated in polymer and said fraction is recycled to the precipitation zone.

3. The process of claim 1 in which the solid olefin polymer is a polymer of ethylene having a specific gravity in the range of 0.94 to 0.96.

4. A process for recovering a solid ethylene polymer from a solution thereof in a plurality of precipitation zones in cyclic operation, comprising, introducing said solution into one of said precipitation zones; reducing the pressure in said precipitation zone to produce auto-refrigeration, the rate of pressure reduction being controlled to provide a substantially uniform rate of temperature decrease in the cooling zone of 1 to 20° F. per minute; stopping the pressure reduction after 90 to 98 weight percent of the polymer has precipitated; removing the resulting mixture of precipitated polymer and solvent from the precipitated zone; separating precipitated polymer from the solution; and recycling the solution separated from the solid polymer containing polymer dissolved therein directly to the precipitation zone whereby substantially all the polymer is ultimately precipitated from the solution.

5. The process of claim 4 in which a portion of the separated polymer solution is recycled and the remainder of said solution is processed to recover a fraction concentrated in polymer and said reaction is recycled to the precipitation zone.

References Cited in the file of this patent

UNITED STATES PATENTS 2,731,452    Field et al. _____ Jan. 17, 1956